(12) United States Patent
Sun et al.

(10) Patent No.: US 7,386,449 B2
(45) Date of Patent: Jun. 10, 2008

(54) KNOWLEDGE-BASED FLEXIBLE NATURAL SPEECH DIALOGUE SYSTEM

(75) Inventors: Jiping Sun, Waterloo (CA);
Fakhreddine Karray, Waterloo (CA);
Otman A. Basir, Waterloo (CA)

(73) Assignee: Voice Enabling Systems Technology Inc., Waterloo (CA)

( * ) Notice: Subject to any disclaimer, the term of this patent is extended or adjusted under 35 U.S.C. 154(b) by 808 days.

(21) Appl. No.: 10/734,089

(22) Filed: Dec. 11, 2003

(65) Prior Publication Data

US 2004/0186730 A1    Sep. 23, 2004

Related U.S. Application Data

(60) Provisional application No. 60/432,569, filed on Dec. 11, 2002.

(51) Int. Cl.
*G10L 15/18* (2006.01)
(52) U.S. Cl. .............. 704/257; 704/9; 704/270.1; 704/275; 704/251
(58) Field of Classification Search ............... 704/277, 704/257, 9, 275, 251, 270.1, 246
See application file for complete search history.

(56) References Cited

U.S. PATENT DOCUMENTS

| | | | |
|---|---|---|---|
| 4,624,008 A | 11/1986 | Vensko et al. | |
| 5,621,854 A | 4/1997 | Hollier | |
| 5,652,828 A | 7/1997 | Silverman | |
| 6,070,140 A | 5/2000 | Tran | |
| 6,219,643 B1 | 4/2001 | Cohen et al. | |
| 6,311,159 B1* | 10/2001 | Van Tichelen et al. | 704/275 |
| 6,560,590 B1 | 5/2003 | Shwe et al. | |
| 6,615,172 B1* | 9/2003 | Bennett et al. | 704/257 |
| 6,654,718 B1 | 11/2003 | Maeda et al. | |
| 6,851,115 B1* | 2/2005 | Cheyer et al. | 719/317 |
| 6,970,935 B1* | 11/2005 | Maes | 709/230 |
| 7,027,975 B1* | 4/2006 | Pazandak et al. | 704/9 |
| 7,200,559 B2* | 4/2007 | Wang | 704/257 |
| 2002/0184373 A1* | 12/2002 | Maes | 709/228 |
| 2003/0088421 A1* | 5/2003 | Maes et al. | 704/270.1 |

* cited by examiner

*Primary Examiner*—Vijay B Chawan
(74) *Attorney, Agent, or Firm*—Carlson, Gaskey & Olds

(57) ABSTRACT

A knowledge-based natural speech dialogue system includes: (i) a knowledge support system, (ii) a flexible dialogue control system, and (iii) a context information system. Flexibilities of the conversation structure, inherent in mixed-initiative mode for dealing with complex user request, are managed because the knowledge structures involved are represented by additional, powerful knowledge representation tools, and because the context information is retained by more specific data structures, which covers larger temporal scopes by the logic of the conversation, rather than by a fixed locality of the grammar flow. This system provides a simple yet reliable method to compensate for these factors to enable more powerful conversation engines with mixed-initiative capabilities.

12 Claims, 5 Drawing Sheets

KNOWLEDGE-BASED FLEXIBLE NATURAL SPEECH DIALOGUE SYSTEM

This application claims priority to U.S. Provisional Application Ser. No. 60/432,569, filed Dec. 11, 2002.

BACKGROUND OF THE INVENTION

The present invention is mainly directed to a knowledge support and flexible dialogue control system.

Automatic telephone conversation systems, which are activated in response to a user's request through speech for providing information and service, are well known in the IT industry. An automatic telephone conversation system may contain the components such as a speech recognition engine, a text to speech engine, a natural language understanding engine, a dialogue control engine and some business servers. The dialogue control system may further include a dialogue grammar engine for modeling dialogue structures and for guiding the procedure of satisfying user needs.

Several known telephone conversation systems include a dialogue control and dialogue grammar system. The dialogue control system could consist of user intention determination based on dialogue act sequencing. A controller, which is connected to one or a combination of these dialogue grammar models, controls the system dialogue moves in accordance with the user intention decided at a point of the dialogue. In response to the understood user intention, one or more deployment aspects of the telephone conversation system, such as a database server, may be accessed. A conversation system with flexible aspects of dialogue moves control is commonly referred to as a "mixed-initiative" dialogue system.

Dialogue grammar and dialogue control engines are key components of mixed-initiative telephone conversation systems. There are several types such systems but many of them suffer from serious shortcomings. A system that relies on a generative dialogue act grammar may hardly capture the full flexibility of the conversation flow, for instance. A system that retains the interactive information between the user and the system in the local grammar tree recently generated suffers from the inflexibility of knowledge representation as well as limitation of the locality of the temporal scope. A system that relies solely on the grammar structure to capture the user's knowledge, intention or indication cannot account for other aspects of the knowledge structure, such as the ontological structure, for instance.

SUMMARY OF THE INVENTION

In an automatic conversation system according to the present invention, flexibilities of the conversation structure, inherent in mixed-initiative mode for dealing with complex user request, are well-managed because the knowledge structures involved are represented by additional, powerful knowledge representation tools, and because the context information is retained by more specific data structures, which covers larger temporal scopes by the logic of the conversation, rather than by a fixed locality of the grammar flow. This invention provides a simple yet reliable method to compensate for these factors to enable more powerful conversation engines with mixed-initiative capabilities.

The present invention is directed to a novel knowledge-based natural speech dialogue system. In accordance with the present invention, a knowledge-based natural speech dialogue system provides: (i) a knowledge support system, (ii) a flexible dialogue management system, and (iii) a context information system.

In accordance with a preferred embodiment of the present invention, the knowledge support module comprises: (a) a knowledge representation database, which supports the knowledge in the form of an ontology and features of entities and activities, (b) an interface to the knowledge database, which accesses the knowledge database and gets relevant information based on user requests.

As for the flexible dialogue management module, it comprises: (a) an interface to the speech recognition engine, through which the recognized words of the user's speech are obtained and further processed, (b) an interface to the natural language understanding engine, to which the recognized words are sent for semantic processing and from which the conceptual meanings of the utterances are obtained, (c) an interface to the knowledge support module in order to obtain needed information, (d) an interface to the context information module in order to obtain information of previous sentences in the dialogue and to store necessary information of the current sentence for use by later stages, and (d) a rule engine in which to store dialogue act strategies which controls the normal flow of conversation according to general principles of verbal interactions.

The context information module comprises: (a) a data structure that is used to store structured information of some foregoing interactions, and (b) a set of updating instructions, which is used by the dialogue management module for accessing and storing information in the context information data structure.

The present invention has no restrictions on the type of knowledge database to be used. Any type of database can be used as long as it provides with the system with the functionality it is supposed to provide it with.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
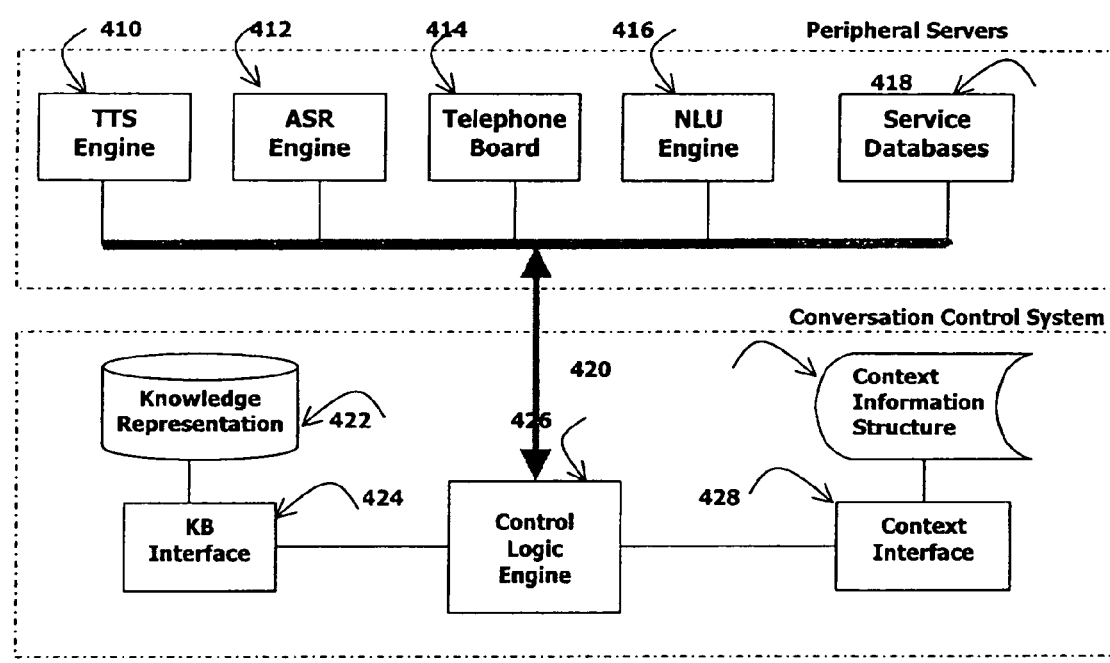
FIG. 1 is a schematic block diagram of the flexible natural speech dialogue system (FNDS).

Referring to FIG. 1, in the flexible natural speech dialogue system (FNDS), the conversation control system is the core of the FNDS and communicates with other servers, such as text-to-speech 410, speech recognition 412, telephone interface 414, natural language understanding 416, business servers 418. The core dialogue management system comprises knowledge representation database 422, knowledge base interface 424, dialogue act logic unit 426, context information storage 420 and context information interface 428. The flexible dialogue control core system receives recognition results, calls natural language understanding unit to obtain the conceptual representation. Based on the conceptual representation the control unit calls context information for further interpretation of the meaning. Then the control unit calls knowledge support unit 422, 424 and dialogue act rules 426 in order to decide the response to the user. In case clarification or repair is needed, it initiates a sub-dialogue based on dialogue act principles; The core control unit then generates responses to the user by calling the TTS engine. In case some other services are requested, such as search or update databases, it will access the business databases as well.

Figure 2:
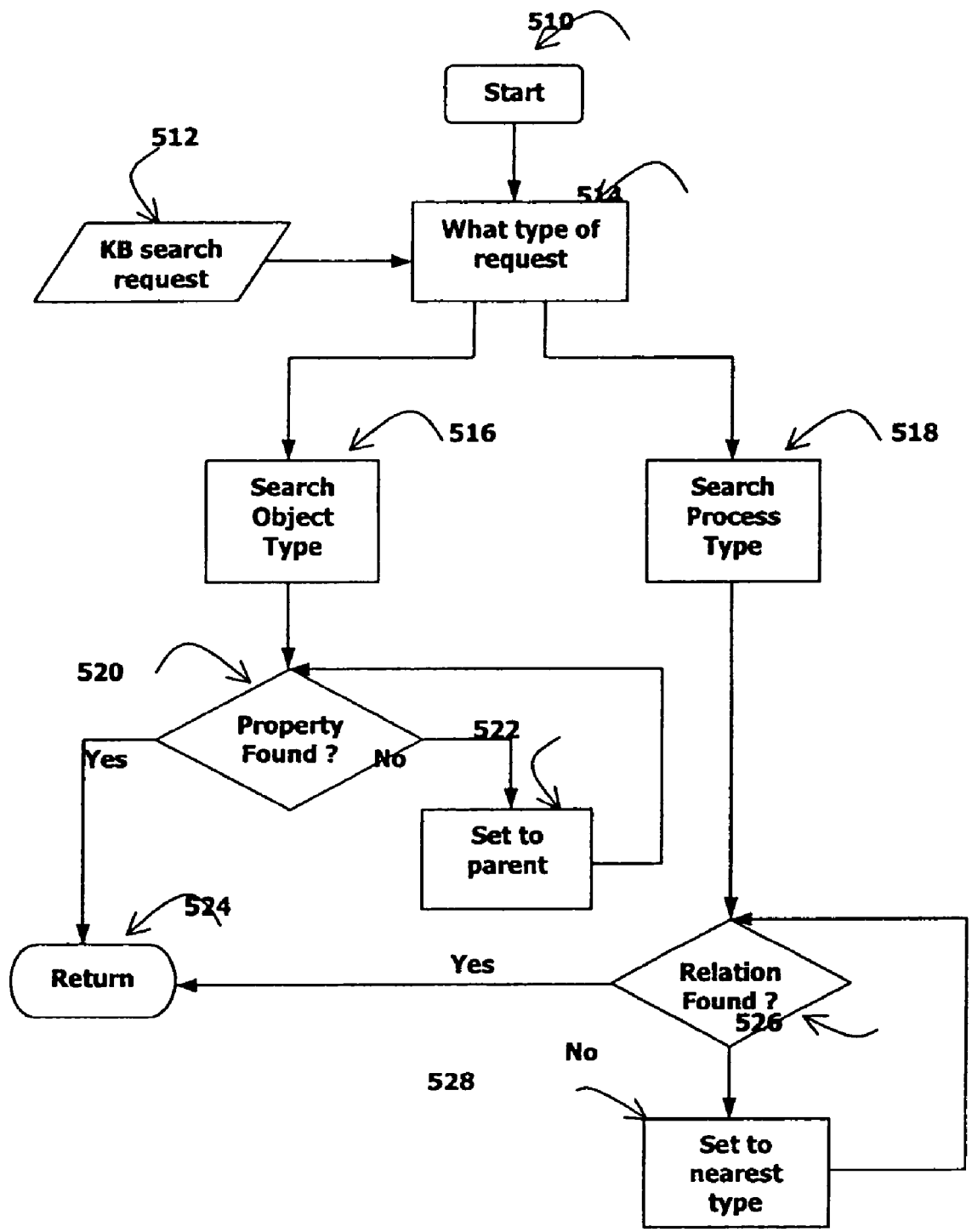
FIG. 2 is a flow chart of the knowledge support algorithm.

FIG. 2 provides a flow chart of the knowledge support algorithm. Request for knowledge base search 512 comes from the dialogue act control unit. (ref. FIG. 1) The judgment unit 514 decides whether it is a request for objects and their properties 516 or for processes and their relations 518. At decision point 520, if the property is found, results will go out at return 524, otherwise, the parent concept will be searched for the property. At decision point 526, if the relation information is found, it will be sent out. Otherwise, using any nearest neighbor search algorithm for similar concepts, the search is re-directed to this concept. Both of the re-direction procedures are iterative.

Figure 3:
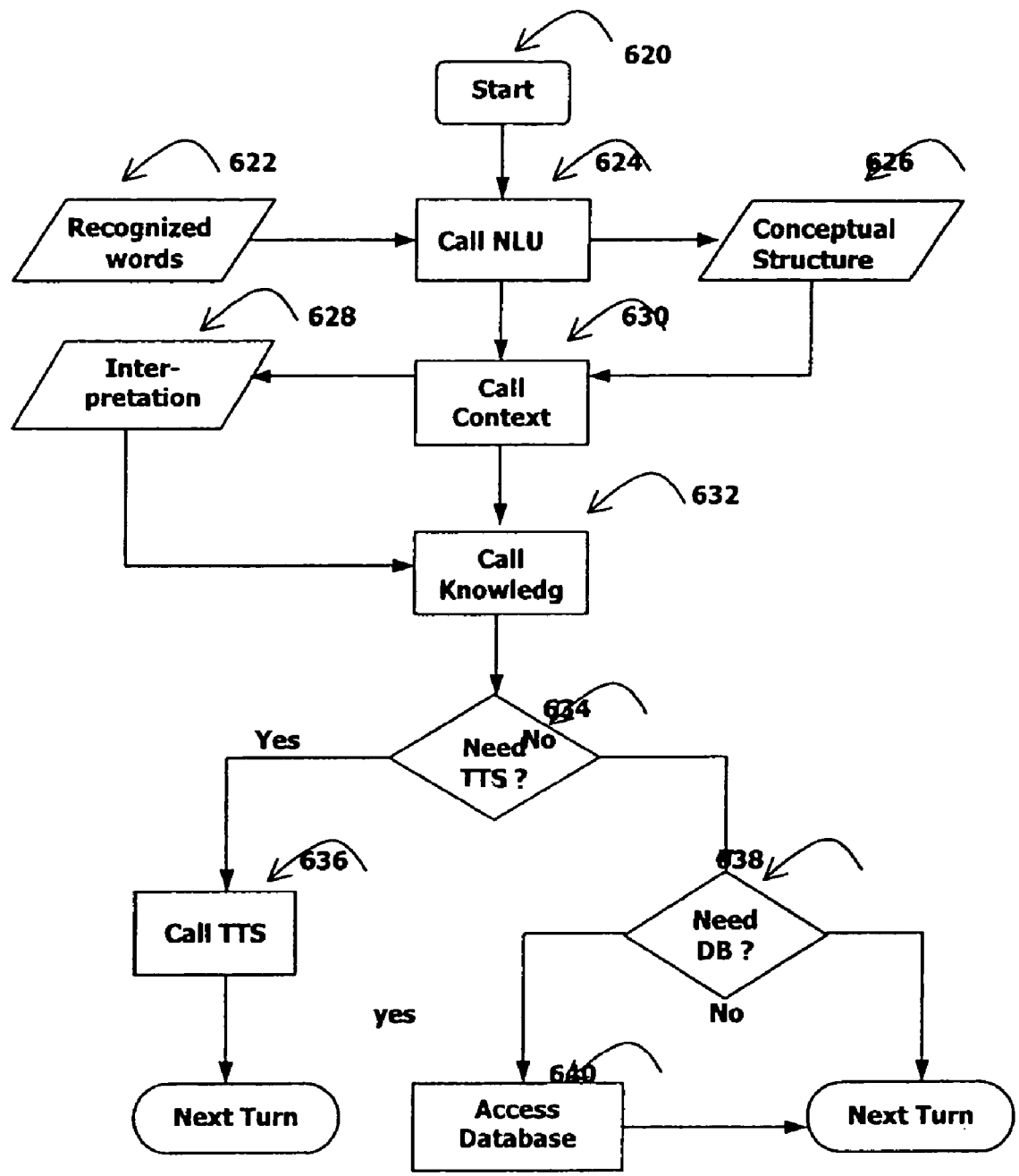
FIG. 3 is a flow chart of the dialogue management algorithm.

FIG. 3 provides a flow chart of the dialogue management algorithm. This unit controls the information flow of the conversation system. Recognized words 622 from the speech recognition engine are sent to natural language understanding engine at procedure 624. The result of conceptual understanding 626 is sent to context rule engine for further interpretation, such as the hidden implicature of the utterance by procedure 630. Once the interpretation is obtained, the knowledge support engine is called at procedure 632 to search relevant knowledge as the basis for generating responses. At decision point 634 TTS engine may be called to generate speech response to the user. At decision point 638 business servers may be called to perform some requested actions for the user, before control is transferred to the next dialogue turn.

Figure 4:
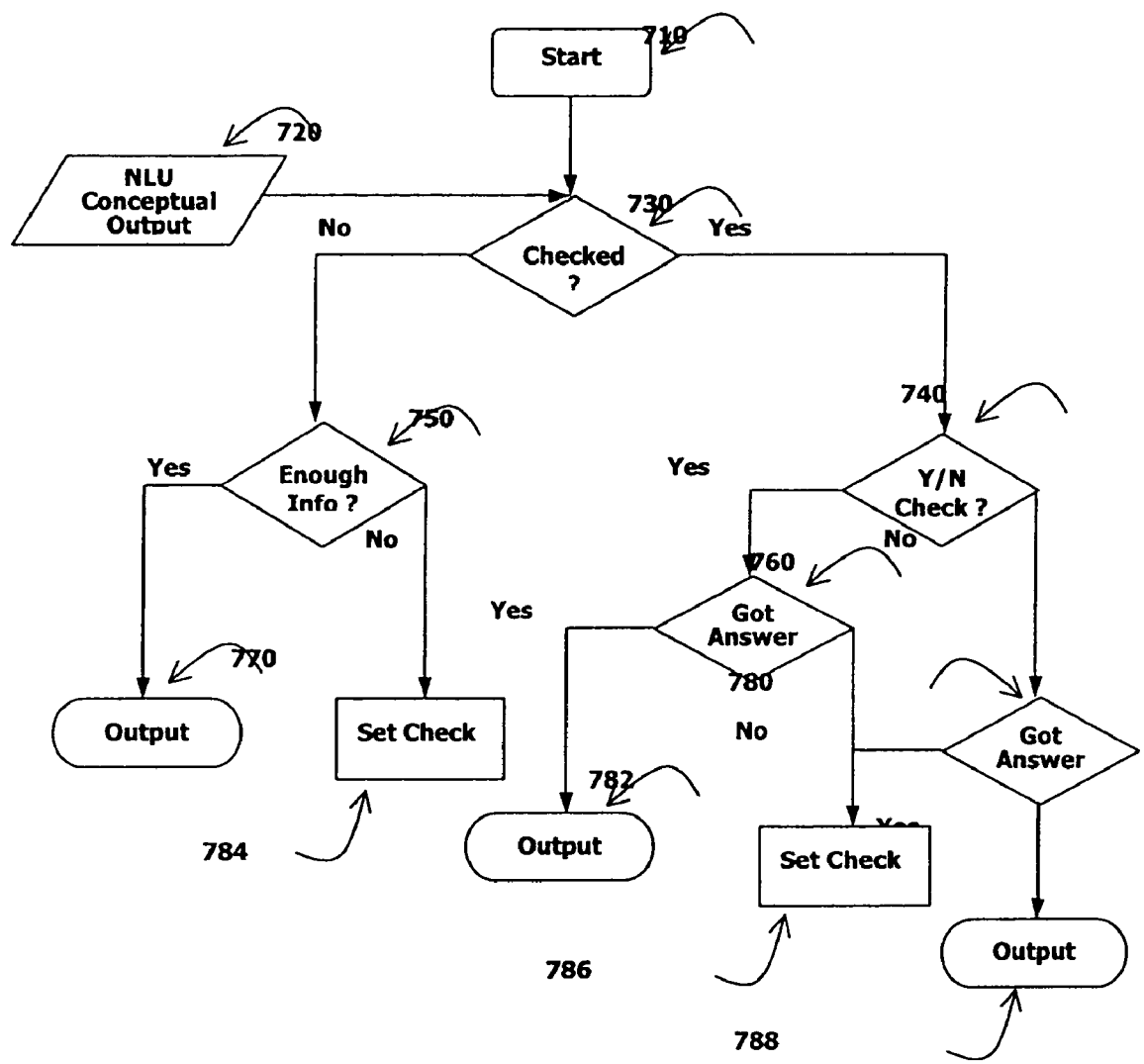
FIG. 4 is a flow chart of the context information update algorithm.

FIG. 4 provides a flow chart of the context information update algorithm. The natural language understanding result 720 is examined at decision point 730 with respect to context information structure (ref. 420 in FIG. 1). At the decision point 750 it is examined whether enough information is contained in the concept structure. If enough information is found, the context information unit generates a normal output 770; otherwise it sets a check for clarification with the user. If the previous context is in checked state, it is examined whether this check is a yes/no question or not 740. With the yes/no check, if the expected answer is obtained, a normal output is generated 782. Otherwise a check is set up again. In case of other checks, again a decision is made at 780 to judge whether expected answer is obtained or not.

Figure 5:
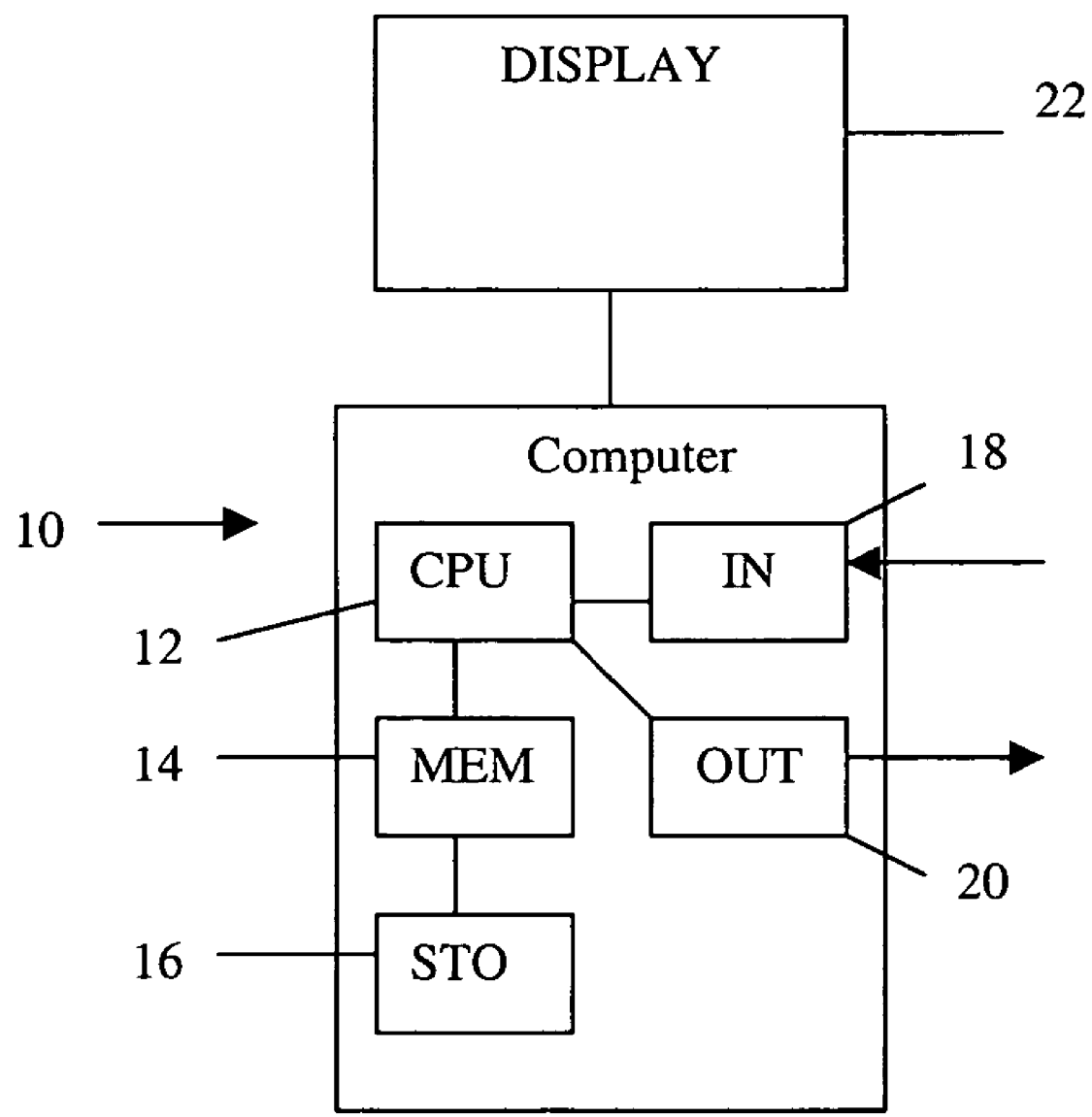
FIG. 5 is a schematic of a computer on which the flexible natural speech dialogue system can be implemented.

FIG. 5 is a schematic for a computer 10 on which the fuzzy natural language concept system described above can be implemented. The computer 10 includes a CPU 12, memory 14, such as RAM, and storage 16, such as a hard drive, RAM, ROM or any other optical, magnetic or electronic storage. The computer 10 further includes an input 18 for receiving the speech input, such as over a telephone line, and an output 20 for producing the responsive speech output, such as over the telephone line. The computer 10 may also include a display 22. The algorithms, software and databases described above with respect to FIGS. 1-4 are implemented on the computer 10 and are stored in the memory 14 and/or storage 16. The computer 10 is suitably programmed to perform the steps and algorithms described herein.

From the above description of a preferred embodiment of the invention, those skilled in the art will perceive improvements, changes and modifications. Such improvements, changes and modifications within the skill of the art are intended to be covered by the appended claims.

What is claimed is:

1. A natural speech dialogue system comprising:
    a natural language understanding engine;
    a speech recognition engine operable to recognize words in a dialogue and to transmit the recognized words to the natural language understanding engine for further processing;
    a knowledge support module, the knowledge support module comprising a knowledge representation database and a knowledge base interface;
    a context information module, the context information module comprising a context information data structure, a context information interface, and at least one dialogue act rule set, wherein the context information data structure is an attribute-value data structure operable to store information of a conversation; and
    a flexible dialogue management module operable to control a flow of information between the knowledge base interface, the context information interface, the speech recognition engine, and the natural language understanding engine, wherein the flexible dialogue management module is operable to apply a set of general dialogue act rules to a conversation in connection with context information from the context information module, and to generate a response to the conversation using the knowledge support module.

2. The natural speech dialogue system of claim 1, further comprising a text to speech engine operable to create a speech signal in response to a text signal from the flexible dialogue management module.

3. The natural speech dialogue system of claim 1, further comprising a telephone interface engine that is coupled to a telephone and the flexible dialogue management module.

4. The natural speech dialogue system of claim 1, wherein the natural speech dialogue system is a mixed-initiative dialogue system.

5. A method of processing dialogue, comprising:
    receiving a dialogue input signal;
    transmitting the dialogue input signal to a speech recognition engine operable to produce recognized words;
    transmitting the recognized words to a natural language understanding engine to obtain a conceptual information related to the recognized words;
    obtaining context information for the recognized words from a context information module;
    creating a user response using a knowledge support module; and
    converting the user response to an audio dialogue output signal using a text to speech engine.

6. The method of claim 5, further comprising selectively initiating a sub-dialogue based on dialogue act principles in response to a request for clarification.

7. The method of claim 5, wherein said obtaining context information step includes searching for a hidden implicature in the audio dialogue input signal.

8. The method of claim 5, wherein said creating a user response using a knowledge support module step further comprises:
    receiving a knowledge base search request; and
    deciding whether the knowledge base search request is a request for objects and associated object properties or a search for processes and associated process relations.

9. The method of claim 8, further comprising:
    a) searching for an object property in a first concept;
    b) searching for the object property in a second parent concept in response too not finding the object property; and c) selectively repeating step (b) until the object property is found.

10. The method of claim 8, further comprising:
a) searching for a process relation corresponding to a first process;
b) performing a search for second process similar to the first process in response to not finding the process relation; and
c) selectively repeating step (b) until the process relation is found.

11. The method of claim 5, further comprising requesting additional instruction from a user in response to receiving insufficient context information from the context information module.

12. The method of claim 5, further comprising transmitting a request to at least one business server in response to a requested action.

* * * * *